United States Patent
Luo et al.

(10) Patent No.: US 9,553,706 B2
(45) Date of Patent: Jan. 24, 2017

(54) CHANNEL ESTIMATE UNDER NON-UNIFORM REFERENCE SIGNAL PATTERN

(71) Applicant: QUALCOMM Incorporated, San Diego, CA (US)

(72) Inventors: Tao Luo, San Diego, CA (US); Michael Mao Wang, San Diego, CA (US); Wanshi Chen, San Diego, CA (US); Peter Gaal, San Diego, CA (US); Yongbin Wei, San Diego, CA (US); Aleksandar Damnjanovic, Del Mar, CA (US); Hao Xu, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 14/275,803

(22) Filed: May 12, 2014

(65) Prior Publication Data
US 2014/0341050 A1  Nov. 20, 2014

Related U.S. Application Data

(60) Provisional application No. 61/823,885, filed on May 15, 2013.

(51) Int. Cl.
*H04L 5/00* (2006.01)
*H04W 24/02* (2009.01)
*H04L 25/02* (2006.01)

(52) U.S. Cl.
CPC .......... *H04L 5/0053* (2013.01); *H04L 5/0048* (2013.01); *H04L 5/0051* (2013.01); *H04L 5/0058* (2013.01);
(Continued)

(58) Field of Classification Search
CPC .. H04L 5/0053; H04L 5/0048; H04L 25/0236; H04L 5/0058; H04L 25/0202; H04L 25/0224; H04L 5/0051; H04W 24/02; H04W 72/0446
See application file for complete search history.

(56) References Cited

U.S. PATENT DOCUMENTS

| 2004/0085917 | A1* | 5/2004 | Fitton | H04L 1/0061 370/292 |
| 2010/0091826 | A1* | 4/2010 | Chen | H04L 25/0236 375/224 |

(Continued)

FOREIGN PATENT DOCUMENTS

| EP | 1427155 A2 | 6/2004 |
| EP | 2464076 A2 | 6/2012 |

(Continued)

OTHER PUBLICATIONS

Samsung, Avoidance of DMRS collision with PSS and SSS, 3GPP TSG RAN WG1 #63bis, Dublin, Ireland, Jan. 17-21, 2011, R1-110088.*

(Continued)

*Primary Examiner* — Chi H Pham
*Assistant Examiner* — Shailendra Kumar
(74) *Attorney, Agent, or Firm* — Arent Fox LLP

(57) ABSTRACT

Reference signals may not uniformly span over time and/or frequency on a resource unit. For example, reference signals may non-uniformly occupy symbols of a subframe. Alternatively, reference signals normally transmitted over certain tones of a subframe may have to be punctured to avoid collisions with a PSS and/or SSS transmitted over the same tones. Consequently, a UE may only be able to use a subset of reference signal tones for performing channel estimation. Accordingly, a method, an apparatus, and a computer program product for wireless communication are provided for (Continued)

improving channel estimation under a non-uniform signal pattern. The apparatus indicates to a UE to utilize a subset of reference signals to derive a channel estimate for demodulating data in a specific subframe, and transmits a plurality of subframes, the plurality of subframes including the reference signals and the specific subframe, the specific subframe including a PSS and/or SSS.

30 Claims, 15 Drawing Sheets

(52) U.S. Cl.
CPC ....... *H04L 25/0202* (2013.01); *H04L 25/0224* (2013.01); *H04L 25/0236* (2013.01); *H04W 24/02* (2013.01)

(56) References Cited

U.S. PATENT DOCUMENTS

| | | | |
|---|---|---|---|
| 2011/0205954 A1* | 8/2011 | Gorokhov | H04L 5/0007 370/315 |
| 2011/0217985 A1* | 9/2011 | Gorokhov | H04W 24/10 455/452.2 |
| 2012/0163335 A1* | 6/2012 | Chung | H04L 5/0023 370/330 |
| 2013/0308596 A1* | 11/2013 | Nam | H04W 72/0446 370/330 |
| 2015/0162966 A1* | 6/2015 | Kim | H04B 17/00 370/252 |

FOREIGN PATENT DOCUMENTS

| | | |
|---|---|---|
| WO | 2007021952 A2 | 2/2007 |
| WO | 2011017467 A2 | 2/2011 |
| WO | 2013172559 A1 | 11/2013 |

OTHER PUBLICATIONS

International Search Report and Written Opinion—PCT/US2014/037882—ISA/EPO—Oct. 21, 2014.
Partial International Search Report—PCT/US2014/037882—ISA/EPO—Aug. 21, 2014.
Samsung: "Avoidance of DMRS collision with PSS and SSS", 3GPP Draft; R1-110088, 3rd Generation Partnership Project (3GPP), Mobile Competence Centre ; 650, Route Des Lucioles ; F-06921 Sophia-Antipolis Cedex; France, vol. RAN WG1, No. Dublin, Ireland; Jan. 17, 2011, Jan. 11, 2011 (Jan. 11, 2011), XP050490058.

* cited by examiner

CHANNEL ESTIMATE UNDER NON-UNIFORM REFERENCE SIGNAL PATTERN

CROSS-REFERENCE TO RELATED APPLICATION(S)

This application claims the benefit of U.S. Provisional Application Ser. No. 61/823,885, entitled "IMPROVED CHANNEL ESTIMATE UNDER NON-UNIFORM REFERENCE SIGNAL PATTERN" and filed on May 15, 2013, which is expressly incorporated by reference herein in its entirety.

BACKGROUND

Field

The present disclosure relates generally to communication systems, and more particularly, to improving a channel estimate when reference signals do not uniformly span over time and/or frequency on a resource unit.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Reference signals may not uniformly span over time and/or frequency on a resource unit. For example, in certain configurations, reference signals (e.g., common reference signals (CRS)) may non-uniformly occupy symbols of a subframe. In other configurations, reference signals (e.g., UE-specific reference signals (UE-RS)) normally transmitted over certain tones of a subframe may have to be punctured to avoid collisions with a primary synchronization signal (PSS) and/or secondary synchronization signal (SSS) transmitted over the same tones. Consequently, a UE may only be able to use a subset of reference signal tones for performing channel estimation.

Accordingly, a method, an apparatus, and a computer program product for wireless communication are provided for improving channel estimation under a non-uniform signal pattern. The apparatus indicates to a UE to utilize a subset of a plurality of UE-RSs to derive a channel estimate for demodulating data in a specific subframe. The apparatus also transmits a plurality of subframes. The plurality of subframes includes the plurality of UE-RS and the specific subframe. The specific subframe may include a reduced number of UE-RSs. The specific subframe may also include a PSS and/or SSS.

In another aspect, the apparatus receives an indication from a base station to utilize a subset of a plurality of UE-specific reference signals (UE-RSs) for deriving a channel estimate for demodulating data, the plurality of UE-RSs transmitted in a plurality of subframes. The apparatus derives a channel estimate for demodulating data transmitted in a specific subframe using the indicated subset of UE-RSs, the specific subframe included in the plurality of subframes.

In a further aspect, the apparatus receives a transport block comprising a plurality of code blocks, attempts to decode the plurality of code blocks using a first channel estimate, determines that at least one code block failed a cyclic redundancy check (CRC), determines a first code block that passed the CRC, derives an improved channel estimate using a data tone of the first code block that passed the CRC as a reference signal, and decodes the at least one code block that failed the CRC using the improved channel estimate.

In another aspect, the apparatus receives a transport block comprising a plurality of code blocks, attempts to decode the plurality of code blocks using a first channel estimate, obtains a metric for each code block of the plurality of code blocks, determines that a metric for at least one code block failed to meet a predefined criteria, determines that a metric for a first code block meets the predefined criteria, derives an improved channel estimate using a data tone of the first code block having the metric that meets the predefined criteria as a reference signal, and decodes the at least one code block having the metric that failed to meet the predefined criteria using the improved channel estimate.

In a further aspect, the apparatus receives a transport block comprising a single code block, the single code block comprising a plurality of segments, attempts to decode the plurality of segments of the single code block using a first channel estimate, obtains a metric for each segment of the plurality of segments, chooses a segment based on the obtained metric, derives an improved channel estimate using a data tone of the chosen segment as a reference signal, and decodes other segments of the single code block using the improved channel estimate.

DETAILED DESCRIPTION

Figure 1:
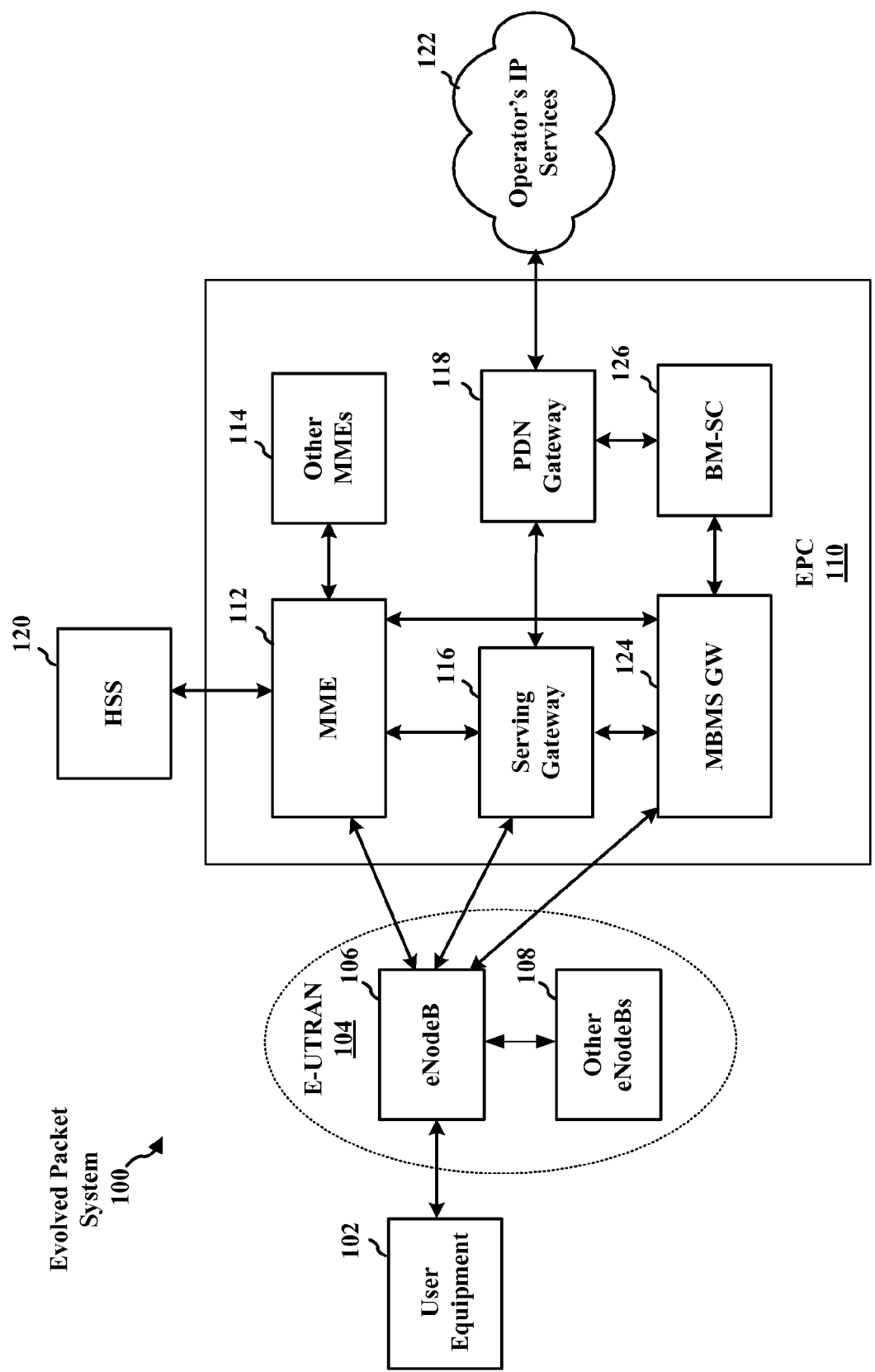
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
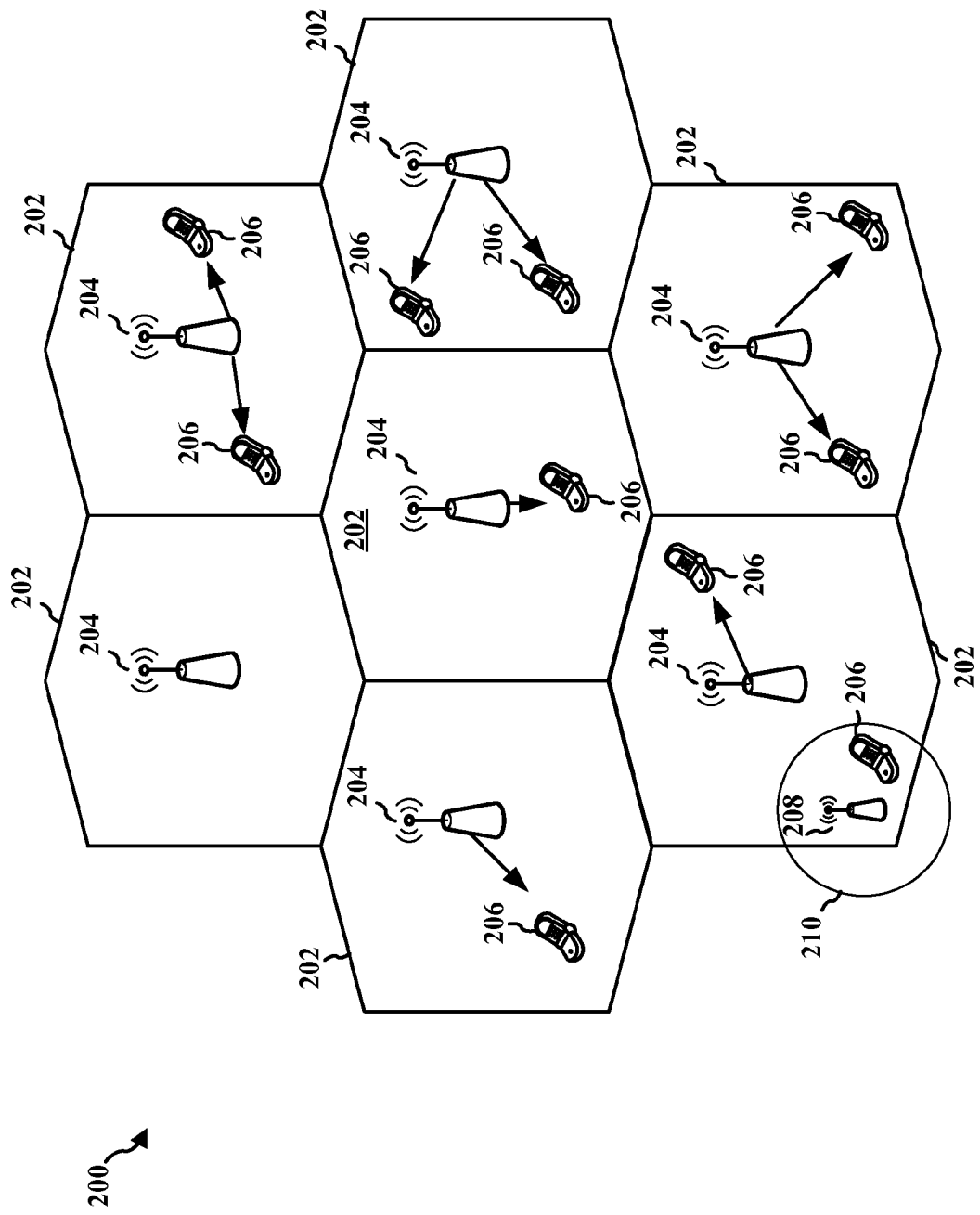
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
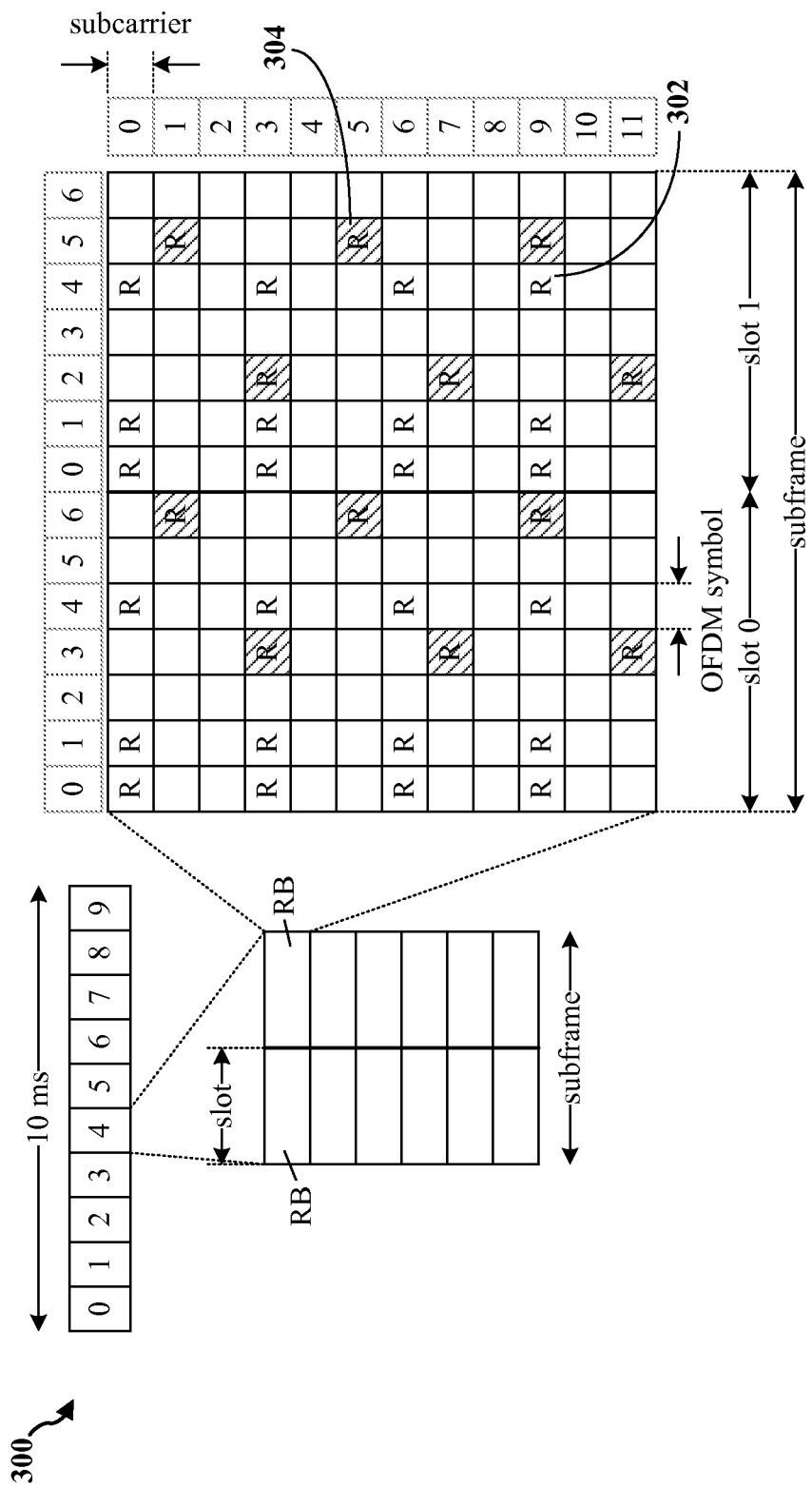
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
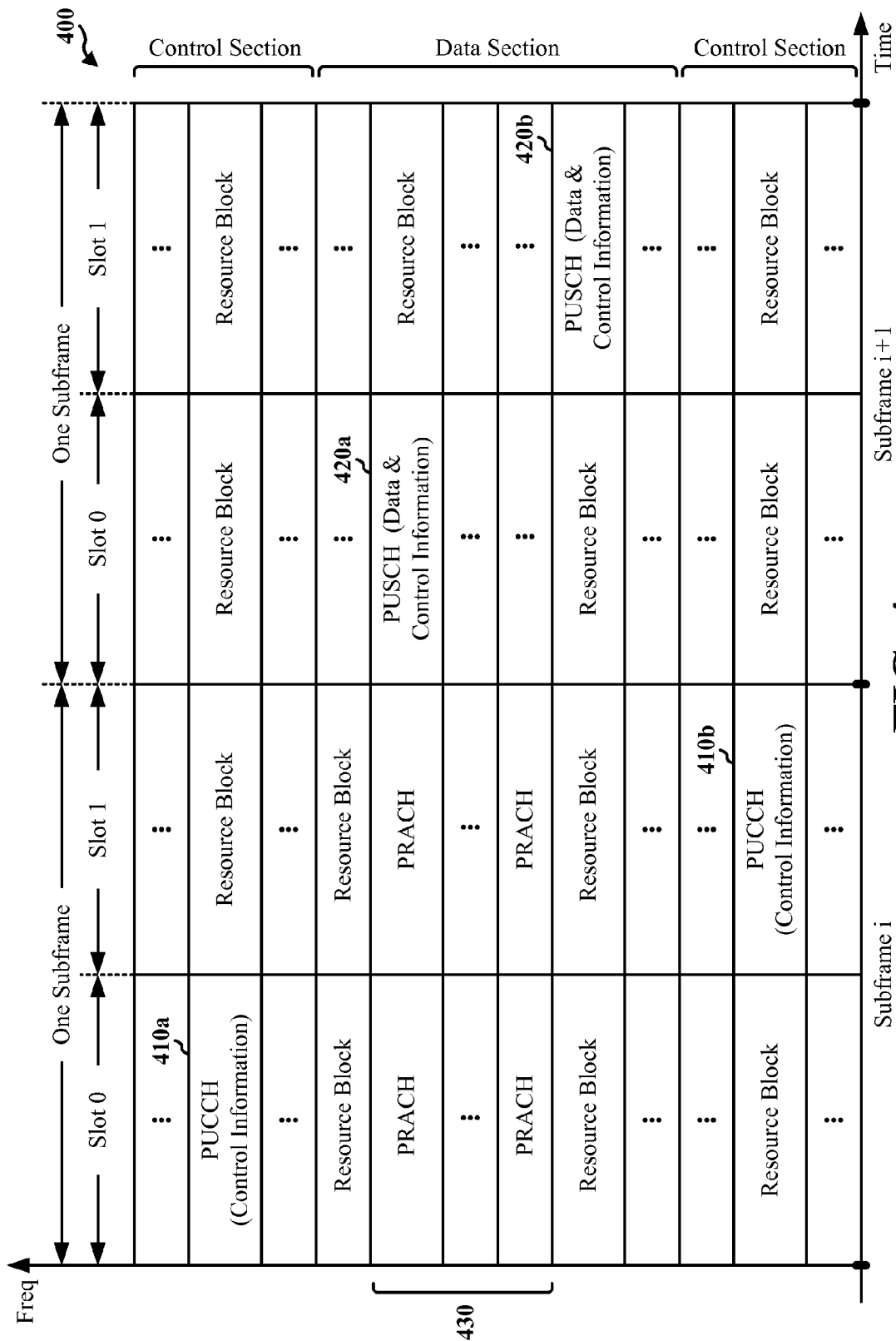
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size.

The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
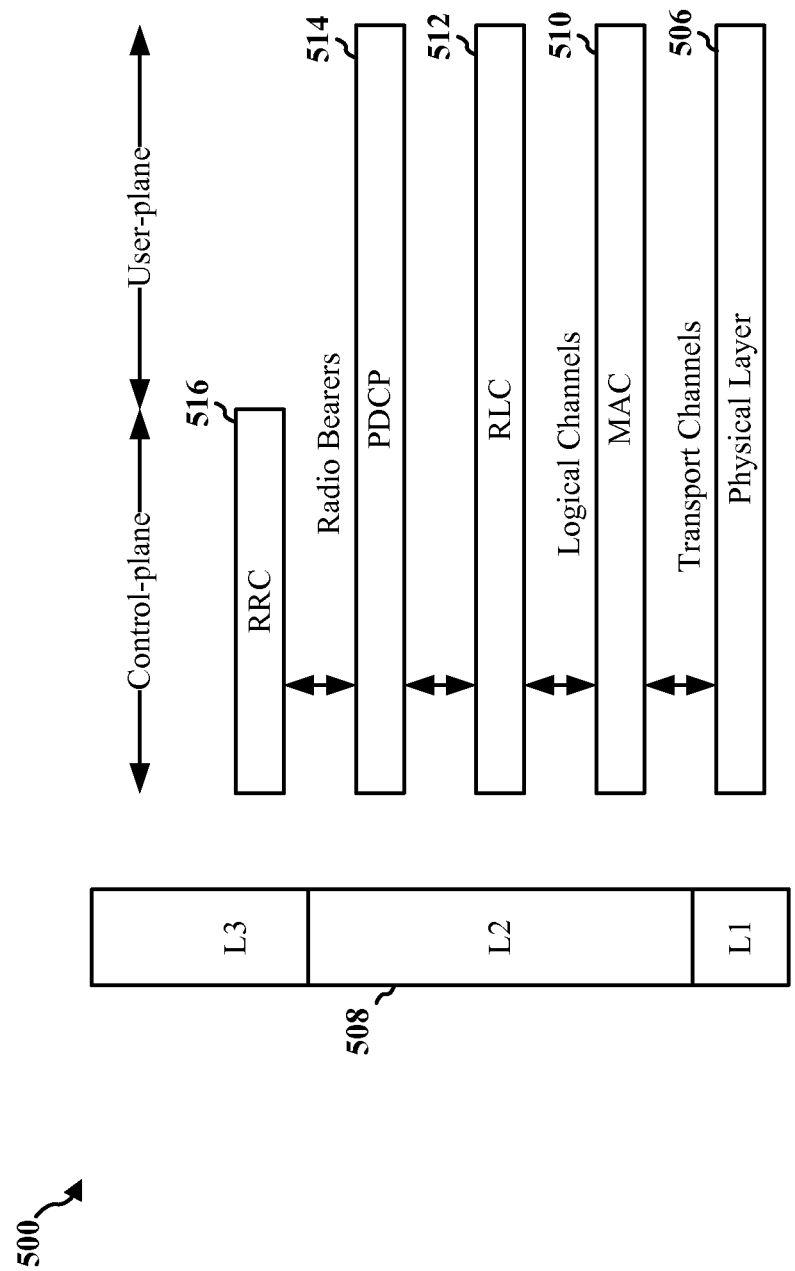
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
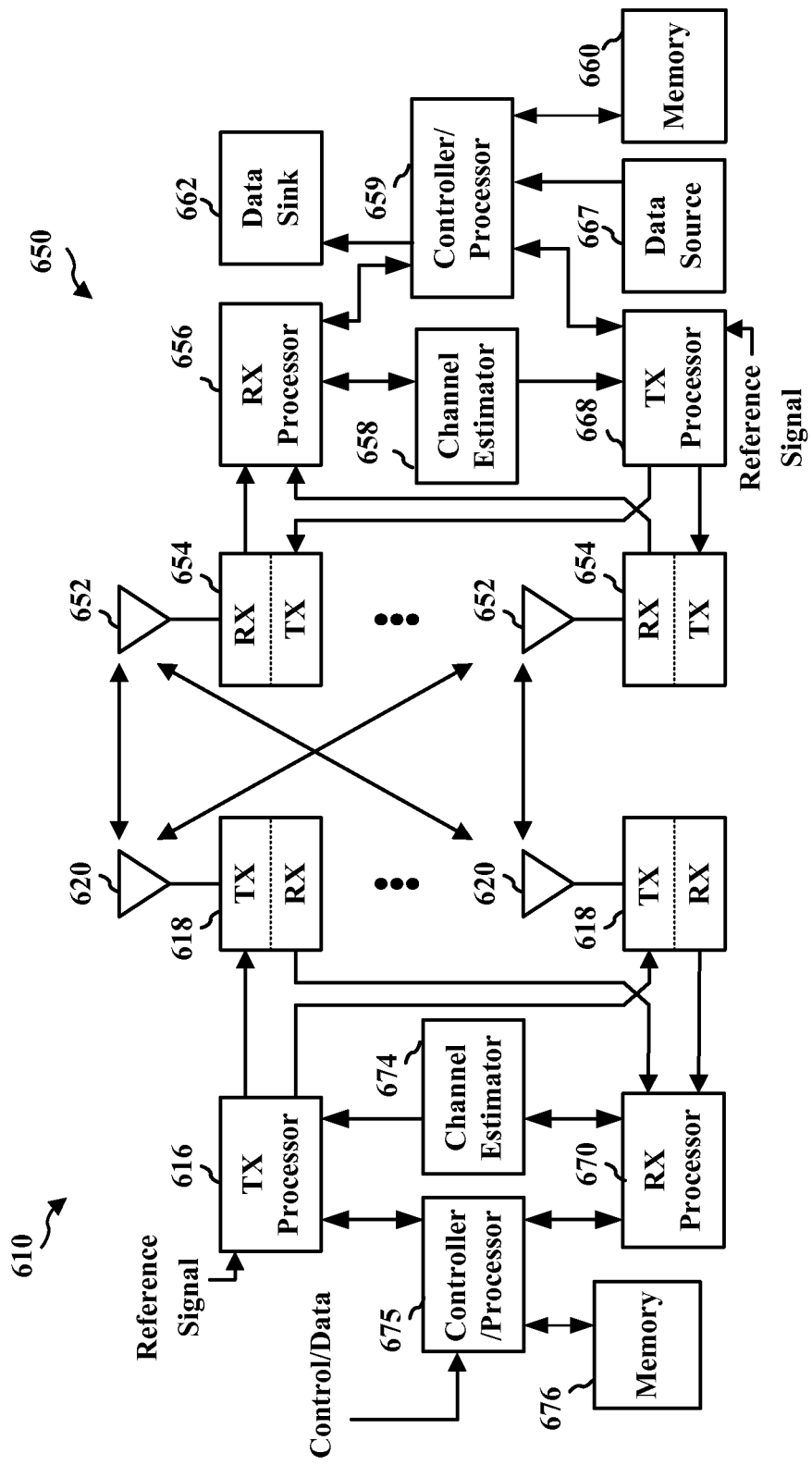
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In an aspect, reference signals may not uniformly span over time and/or frequency on a resource unit. For example, in one resource block (RB) pair of an LTE communication system (hereinafter "condition A"), a common reference signal (CRS) may occupy symbols 0, 4, 7 and 11 of a subframe with a normal cyclic prefix (CP) duration. A UE-specific reference signal (UE-RS) for transmission mode 8, 9, 10, or 11 may occupy symbols 5/6 and 12/13 of a subframe with a normal CP duration.

In another example, reference signals may not uniformly span over time and/or frequency on a resource unit when a central six resource blocks of a specific bandwidth are used to transmit a primary synchronization signal (PSS), a secondary synchronization signal (SSS), or both (hereinafter "condition B"). Under condition B, the PSS/SSS may be transmitted on the same tones as UE-RS. To avoid collisions due to the PSS/SSS having the same resource location as the UE-RS, the UE-RS may be punctured over tones on which the PSS/SSS is transmitted. For example, the UE-RS may be transmitted only in symbols 12 and 13 of the subframe. Consequently, a UE may only be able to use a subset of UE-RS tones for performing channel estimation.

In a further example, since reference signals may not uniformly span over time and/or frequency on a resource unit, the UE may not effectively handle the case when noise is not uniform over time and/or frequency within the resource unit. For example, a Wi-Fi device may create noise over a subset of time durations within one subframe.

In an aspect, a transport block may be divided into N code blocks and be mapped to a resource unit in a time-first or frequency-first manner. For example, for an LTE downlink transmission, a transport block (or code blocks when the transport block includes a plurality of code blocks) may be mapped to resource unit(s) in a frequency-first, time-second manner. In another example, for an LTE uplink transmission, a transport block (or code blocks when the transport block includes a plurality of code blocks) may be mapped to resource unit(s) in a time-first, frequency-second manner.

A transport block, having a plurality of code blocks, may fail a cyclic redundancy check (CRC) even when a subset of the code blocks pass the CRC. This may be due to a variation of channel estimation quality. For example, a channel estimate and/or a noise estimation may vary between code blocks. A transport block with only one code block may also see a variation of channel estimation quality over different portions of a signal over time and/or frequency.

In an aspect, for condition B, an eNB may indicate to a UE to utilize a subset of a plurality of UE-specific reference signals (UE-RSs) to derive a channel estimate for demodulating data in a subframe. For example, the eNB may signal the UE to use UE-RS transmitted on tones in the subframe, wherein the subframe includes a PSS/SSS transmission. Additionally or alternatively, the eNB may signal the UE to use UE-RS transmitted on tones in a subframe that does not include a PSS/SSS transmission to derive a channel estimate for demodulating data in the subframe that includes the PSS/SSS transmission. The eNB may signal the UE with the indication via Layer 1-based signaling (e.g., PDCCH signaling) and/or radio resource control (RRC)-based signaling.

The UE-RS transmitted on the tones in the subframe that does not include the PSS/SSS transmission may have a fixed relationship (e.g., an associated precoding) with UE-RS transmitted on tones in the subframe that includes the PSS/SSS transmission. Moreover, the tones on which the UE-RS are transmitted in the subframe that does not include the PSS/SSS transmission may be located within six central resource blocks of a predetermined bandwidth.

In an aspect, for conditions A and B, a UE may derive an improved channel estimate and decode a transport block (or code block(s)) that failed a cyclic redundancy check (CRC) using the improved channel estimate. For example, when a transport block comprises a plurality of code blocks, the UE may use a first channel estimate (using a reference signal only) to decode the plurality of code blocks. If there is at least one code block that failed the CRC and at least one code block that passed the CRC, the UE may derive an improved channel estimate using a data tone of a code block that passed the CRC as a reference signal. Thereafter, the UE may decode the at least one code block that failed the CRC using the improved channel estimate.

The process may repeat. Therefore, whenever a code block passes the CRC, additional tones from the code block together with other tones already available (e.g., reference signal tones and/or data tones over which code blocks have passed the CRC) may be used to improve the channel estimate for other code blocks still failing the CRC.

In another aspect, for conditions A and B, a UE may derive an improved channel estimate based on an obtained metric and decode a transport block (or code block(s)) using the improved channel estimate. For example, when a transport block comprises a plurality of code blocks, the UE may use a first channel estimate (using a reference signal only) to decode the plurality of code blocks. The UE may then obtain a metric for each code block. If at least one metric indicates that at least one code block failed to meet a predefined criteria (e.g., pass CRC) and at least one metric indicates that at least one code block meets the predefined criteria (e.g., pass CRC), then the UE may derive an improved channel estimate using data tones of code blocks having the metrics that met the predefined criteria as reference signals. Thereafter, the UE may decode the at least one code block having the metric that failed to meet the predefined criteria using the improved channel estimate. The metric may include an indication of whether a code block passes or fails the CRC, an energy metric reflecting a decoding quality, and/or a signal-to-noise ratio.

The above-described process may also repeat. Therefore, whenever a code block has a metric that meets the predefined criteria, additional tones from the code block together with other tones already available (e.g., reference signal tones and/or data tones over which code blocks have metrics that meet the predefined criteria) are used to improve the channel estimate for other code blocks having metrics that still fail to meet the predefined criteria.

In a further aspect, for conditions A and B, a UE may derive an improved channel estimate based on a chosen segment of a transport block and decode other segments of the transport block using the improved channel estimate. For example, a transport block may be divided into N segments over time and/or frequency. Thus, when the transport block comprises a single code block, the single code block may include a plurality of segments, and the UE may use a first channel estimate to attempt to decode the plurality of segments of the single code block.

The UE may obtain a metric for each segment of the plurality of segments, and choose a segment based on the obtained metric. The metric may include an energy metric reflecting a decoding quality and/or a signal-to-noise ratio. The UE may derive an improved channel estimate using a data tone of the chosen segment as a reference signal. Thereafter, the UE may decode other segments of the single code block using the improved channel estimate.

In an aspect, the process(es) described above with respect to deriving an improved channel estimate and decoding based on the improved channel estimate may be applied when the UE processes multiple codewords and/or transport blocks. For example, for each transport block, the UE may apply the process(es) to derive an improved channel estimate and decode each transport block based on the improved channel estimate. The UE may also apply the process(es) in combination with joint detection/decoding of multiple layers/transport blocks and/or interference cancellation between different layers/transport blocks.

In an aspect, depending on the location of a reference signal, the UE may process some segments earlier than other segments. For example, for a segment that is in near proximity to a reference signal, the UE may attempt to decode the segment at a time earlier than a decoding time corresponding to an order in which the segment is received.

Figure 7:
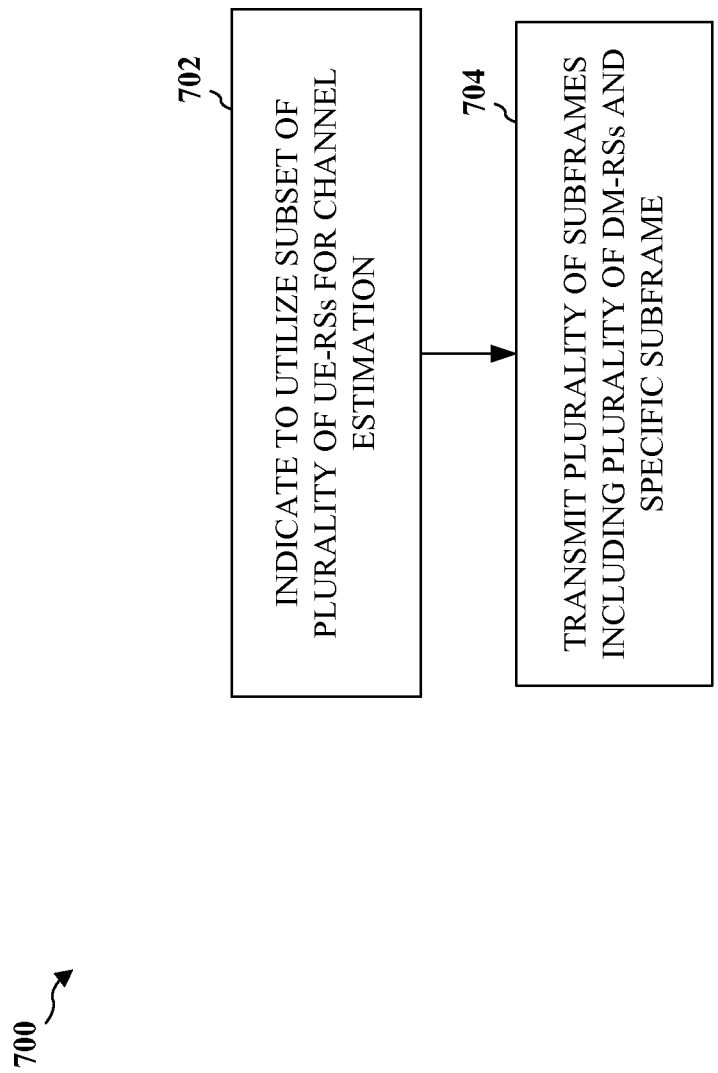
FIG. 7 is a flow chart of a method of wireless communication.

FIG. 7 is a flow chart 700 of a method of wireless communication. The method may be performed by an eNB.

At step 702, the eNB indicates to a UE to utilize a subset of a plurality of UE-specific reference signals (UE-RSs) in order for the UE to derive a channel estimate for demodulating data in a specific subframe. The indication may be provided to the UE via Layer 1-based signaling and/or radio resource control (RRC)-based signaling.

At step 704, the eNB transmits a plurality of subframes. The plurality of subframes may include the plurality of UE-RSs and the specific subframe. The specific subframe may include a reduced number of UE-RSs. Moreover, the specific subframe may include a primary synchronization signal (PSS) and/or a secondary synchronization signal (SSS).

In an aspect, the subset of the plurality of UE-RSs includes UE-RSs transmitted on tones in the specific subframe. In another aspect, the subset of the plurality of UE-RSs includes UE-RSs transmitted on tones in a subframe different from the specific subframe. The UE-RSs transmitted on the tones in the subframe different from the specific subframe may have precoding associated with UE-RSs transmitted on tones in the specific subframe. The tones may be located within six central resource blocks of a predetermined bandwidth.

Figure 8:
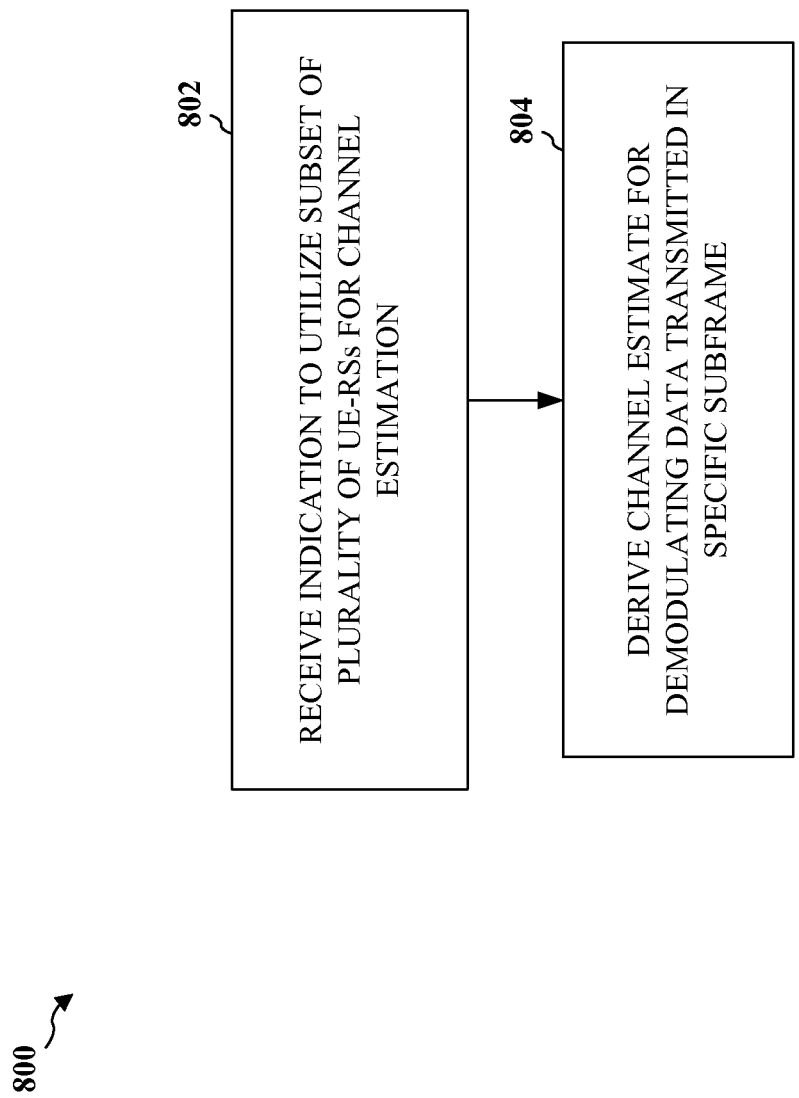
FIG. 8 is a flow chart of a method of wireless communication.

FIG. 8 is a flow chart 800 of a method of wireless communication. The method may be performed by a UE. At step 802, the UE receives an indication from a base station (e.g., eNB) to utilize a subset of a plurality of UE-specific reference signals (UE-RSs) in order for the UE to derive a channel estimate for demodulating data. The plurality of UE-RSs may be transmitted in a plurality of subframes. The indication may be received via Layer 1-based signaling and/or radio resource control (RRC)-based signaling.

At step 804, the UE derives a channel estimate for demodulating data transmitted in a specific subframe using the indicated subset of UE-RSs. The specific subframe may be included in the plurality of subframes.

In an aspect, the subset of the plurality of UE-RSs includes UE-RSs transmitted on tones in the specific subframe, wherein the specific subframe includes a primary synchronization signal (PSS) and/or a secondary synchronization signal (SSS). In another aspect, the subset of the plurality of UE-RSs comprises UE-RSs transmitted on tones in a subframe different from the specific subframe, wherein the specific subframe includes a primary synchronization signal (PSS) and/or a secondary synchronization signal (SSS). The UE-RSs transmitted on the tones in the subframe different from the specific subframe may have a precoding associated with UE-RSs transmitted on tones in the specific subframe. The tones may be located within six central resource blocks of a predetermined bandwidth.

Figure 9:
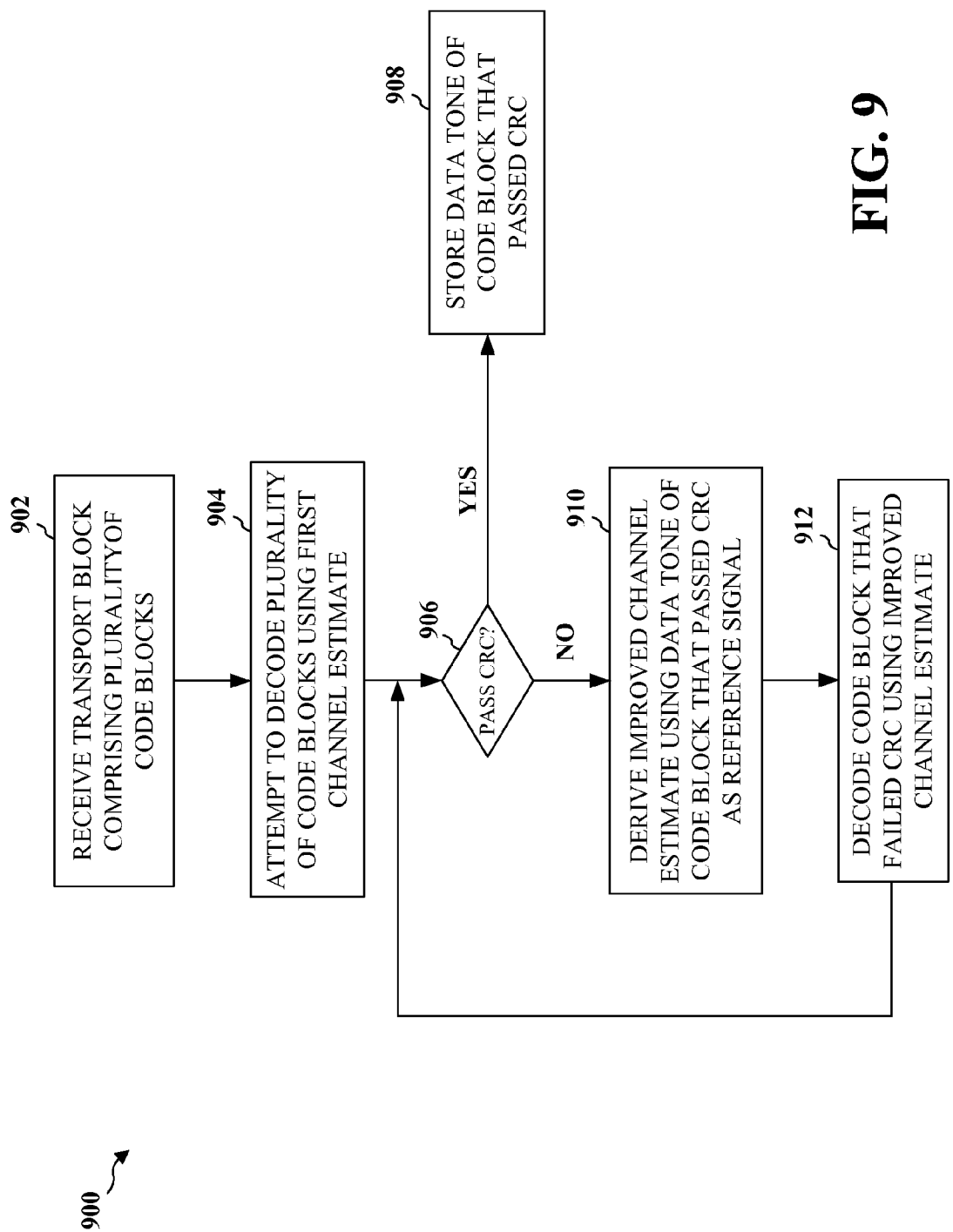
FIG. 9 is a flow chart of a method of wireless communication.

FIG. 9 is a flow chart 900 of a method of wireless communication. The method may be performed by a UE. At step 902, the UE receives a transport block comprising a plurality of code blocks. At step 904, the UE attempts to decode the plurality of code blocks using a first channel estimate. The first channel estimate may be derived using an initial reference signal.

At step 906, the UE determines whether at least one code block passes a cyclic redundancy check (CRC). At step 908, if a code block passes the CRC, the UE stores a data tone of the code block that passed the CRC. The stored data tone may later be used by the UE as a reference signal for deriving an improved channel estimate.

At step 910, if a code block fails the CRC, the UE derives an improved channel estimate using a data tone of a code block that passed the CRC as a reference signal in addition to a received reference signal. Thereafter, at step 912, the UE decodes the at least one code block that failed the CRC using the improved channel estimate.

In an aspect, the operation may repeat to attempt to decode code blocks that still cannot be decoded with the improved channel estimate. For example, after step 912, the UE may proceed to step 906 to determine the existence of at least one other code block that cannot be decoded with the improved channel estimate (e.g., code block still fails CRC). At step 910, if the at least one other code block exists that cannot be decoded with the improved channel estimate, the UE derives a further improved channel estimate using at least one other data tone from a code block that passed the CRC based on the improved channel estimate and/or the existing reference signal. Thereafter, at step 912, the UE decodes the at least one other code block using the further improved channel estimate.

The method depicted in the flow chart 900 may be subject to a maximum execution processing limit or time limit. For example, the method may operate in conjunction with a timer, such that if the timer expires before the entire transport block is decoded, the method is deemed complete and the transport block is deemed not decodable. Alternatively, the process may be limited to a maximum number of iterations. The UE may also compare an energy metric between iterations, and if an energy metric delta is below a predefined threshold, the UE may stop the process. Furthermore, the process may be completely bypassed if the number of code blocks failing the CRC exceeds a threshold limit. In an aspect, the attempt to decode at step 904 may include the UE determining a location of a code block relative to a reference signal. Based at least in part on the location of the code block relative to the reference signal, the UE may attempt to decode the code block at a time earlier than a decoding time corresponding to an order in which the code block is received.

Figure 10:
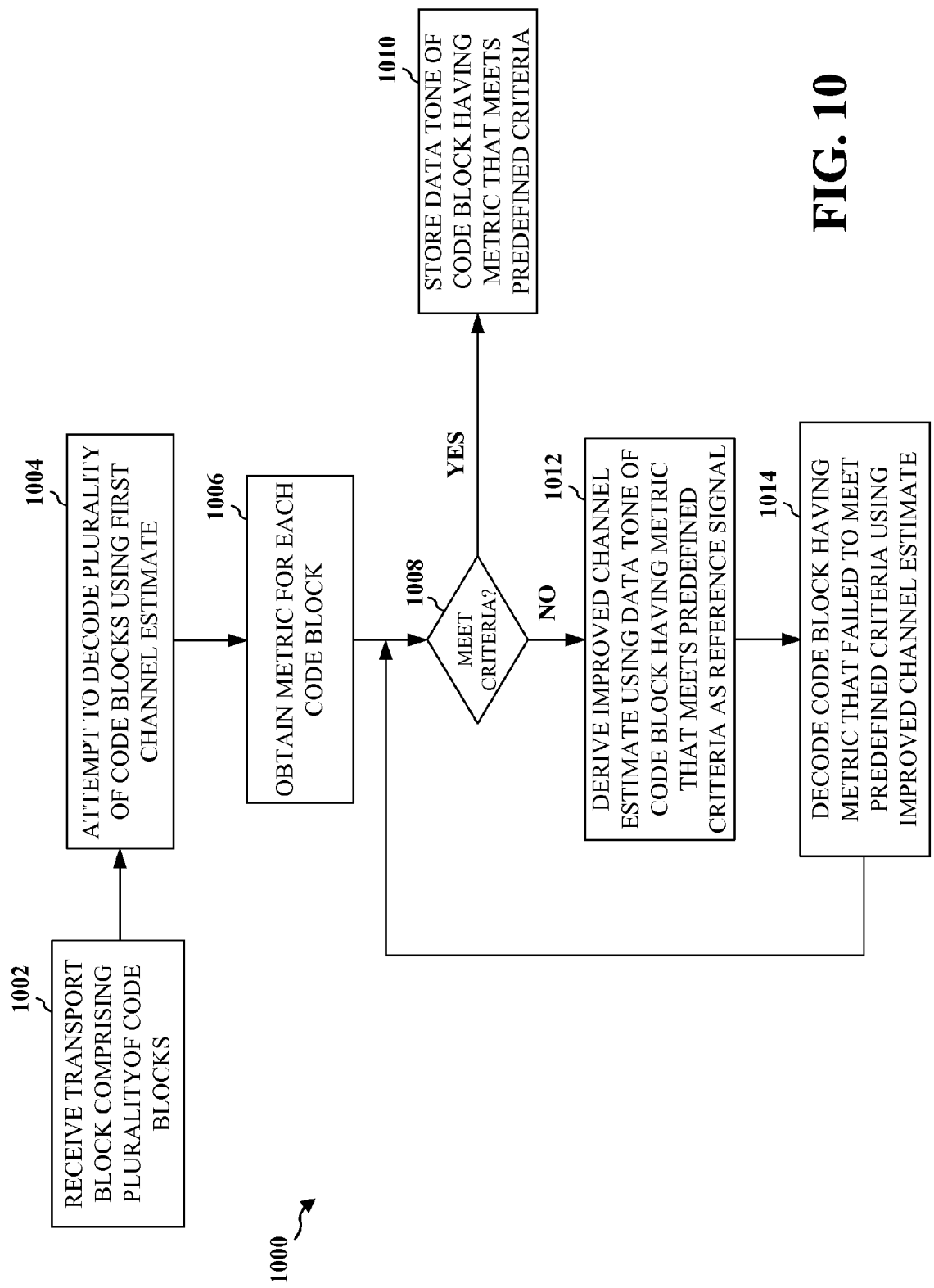
FIG. 10 is a flow chart of a method of wireless communication.

FIG. 10 is a flow chart 1000 of a method of wireless communication. The method may be performed by a UE. At step 1002, the UE receives a transport block comprising a plurality of code blocks. At step 1004, the UE attempts to decode the plurality of code blocks using a first channel estimate. The first channel estimate may be derived using an initial reference signal.

At step 1006, the UE obtains a metric for each code block of the plurality of code blocks. At step 1008, the UE determines whether a metric for at least one code block meets a predefined criteria. The metric may include an indication of whether a code block passes or fails the CRC, an energy metric reflecting a decoding quality, and/or a signal-to-noise ratio.

At step 1010, if a code block has a metric that meets the predefined criteria, the UE stores a data tone of the code block having the metric that meets the predefined criteria. The stored data tone may later be used by the UE as a reference signal for deriving an improved channel estimate.

At step 1012, if a code block has a metric that fails to meet the predefined criteria, the UE derives an improved channel estimate using a data tone of a code block having the metric that meets the predefined criteria as a reference signal. Thereafter, at step 1014, the UE decodes the at least one code block having the metric that failed to meet the predefined criteria using the improved channel estimate.

In an aspect, the operation may repeat to attempt to decode code blocks that have metrics that still do not meet the predefined criteria using the improved channel estimate. For example, after step 1014, the UE may proceed to step 1008 to determine that a metric for at least one code block still fails to meet the predefined criteria. At step 1012, the UE derives a further improved channel estimate using at least one other data tone of at least one other code block having a metric that meets the predefined criteria based on the improved channel estimate. Thereafter, at step 1014, the UE decodes the at least one code block having the metric that still fails to meet the predefined criteria using the further improved channel estimate.

The method depicted in the flow chart 1000 may be subject to a maximum execution processing limit or time limit. For example, the method may operate in conjunction with a timer, such that if the timer expires before the entire transport block is decoded, the method is deemed complete and the transport block is deemed not decodable. Alternatively, the process may be limited to a maximum number of iterations. The UE may also compare an energy metric between iterations, and if an energy metric delta is below a predefined threshold, the UE may stop the process. Furthermore, the process may be completely bypassed if the number of code blocks that have metrics that fail to meet the predefined criteria exceeds a threshold limit. In an aspect, the attempt to decode at step 1004 may include the UE determining a location of a code block relative to a reference signal. Based at least in part on the location of the code block relative to the reference signal, the UE may attempt to decode the code block at a time earlier than a decoding time corresponding to an order in which the code block is received.

Figure 11:
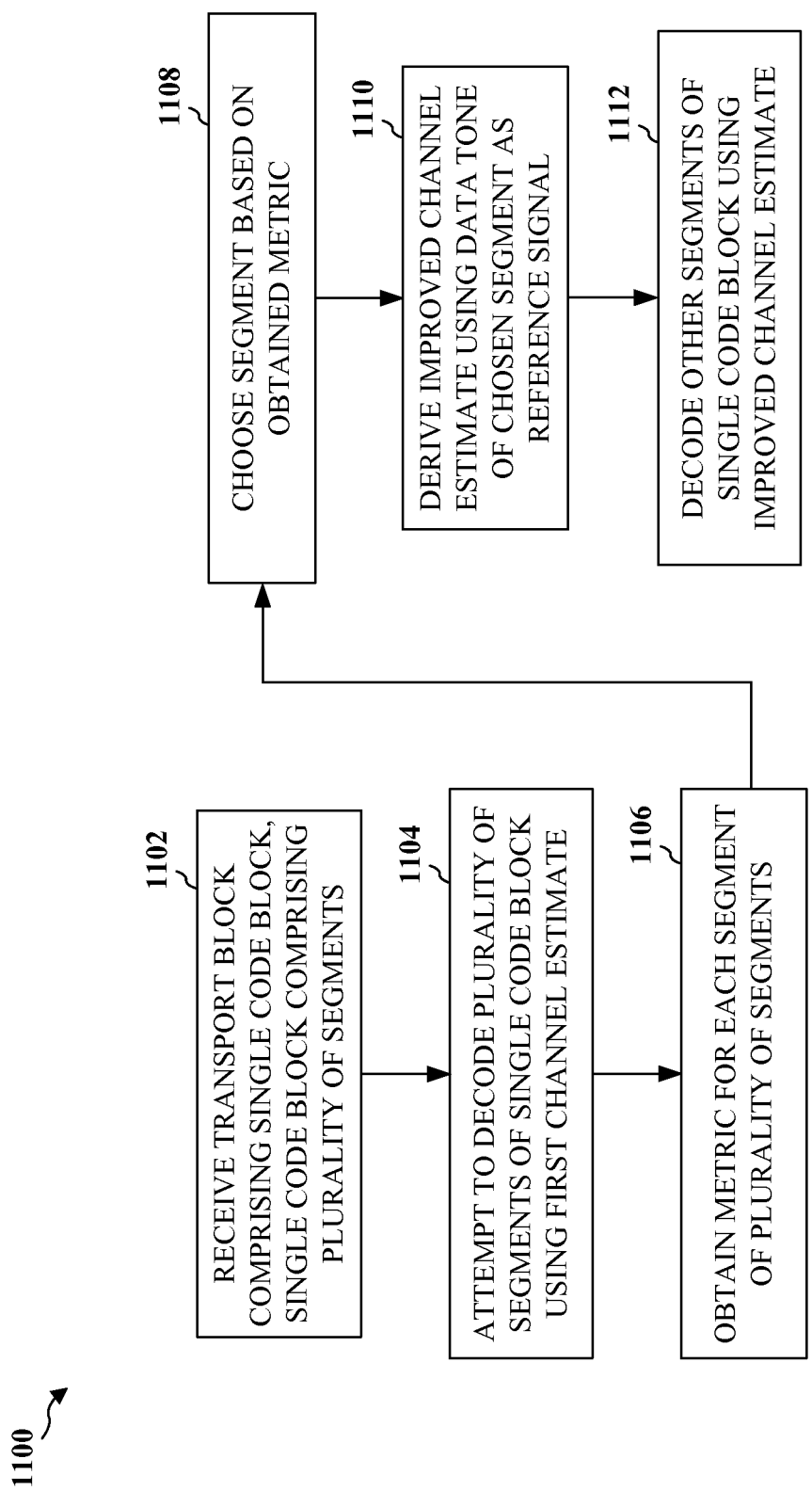
FIG. 11 is a flow chart of a method of wireless communication.

FIG. 11 is a flow chart 1100 of a method of wireless communication. The method may be performed by a UE. At step 1102, the UE receiving a transport block comprising a single code block. The single code block may be divided into N segments over time and/or frequency, wherein N is an integer. Therefore, the single code block may include a plurality of segments.

At step 1104, the UE attempts to decode the plurality of segments of the single code block using a first channel estimate. The first channel estimate may be derived using an initial reference signal.

At step 1106, the UE obtains a metric for each segment of the plurality of segments. The metric may include an energy metric reflecting a decoding quality and/or a signal-to-noise ratio.

At step 1108, the UE chooses a segment based on the obtained metric. At step 1110, the UE derives an improved channel estimate using a data tone of the chosen segment as a reference signal. Thereafter, at step 1112, the UE decodes other segments of the single code block using the improved channel estimate.

The method depicted in the flow chart 1100 may be subject to a maximum execution processing limit or time limit. For example, the method may operate in conjunction with a timer, such that if the timer expires before the entire transport block is decoded, the method is deemed complete and the transport block is deemed not decodable. Alternatively, the process may be limited to a maximum number of iterations. The UE may also compare an energy metric between iterations, and if an energy metric delta is below a predefined threshold, the UE may stop the process. In an aspect, the attempt to decode at step 1104 may include the UE determining a location of a segment relative to a reference signal. Based at least in part on the location of the segment relative to the reference signal, the UE may attempt to decode the segment at a time earlier than a decoding time corresponding to an order in which the segment is received.

Figure 12:
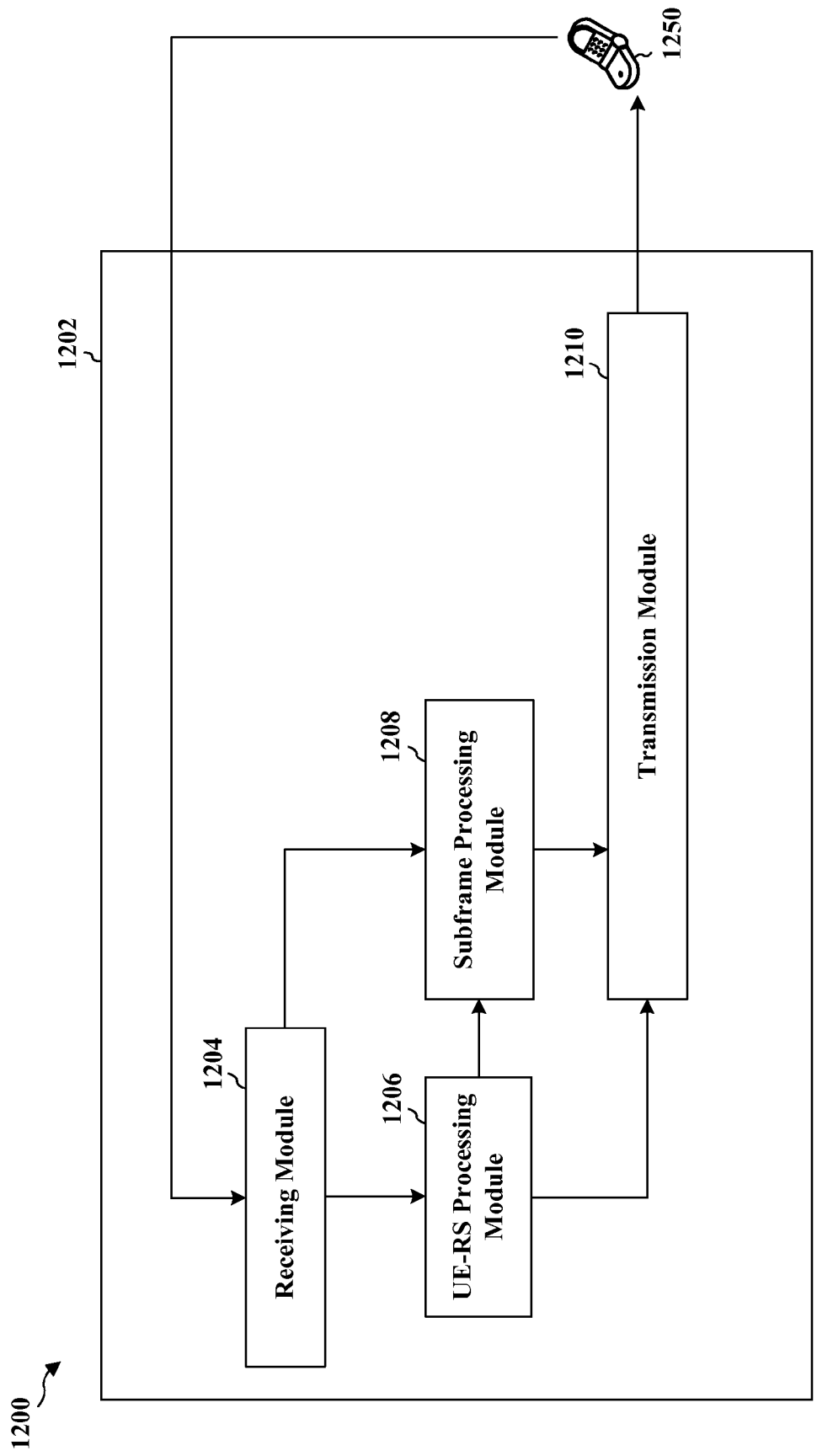
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be an eNB. The apparatus includes a receiving module 1204, a UE-RS processing module 1206, a subframe processing module 1208, and a transmission module 1210.

The apparatus 1202 receives signals from the UE 1250 via the receiving module 1204. The UE-RS processing module 1206 indicates to the UE 1250 (via the transmission module 1210) to utilize a subset of a plurality of UE-specific reference signals (UE-RSs) in order for the UE 1250 to derive a channel estimate for demodulating data in a specific subframe. The indication may be provided to the UE 1250 via Layer 1-based signaling and/or radio resource control (RRC)-based signaling.

The subframe processing module 1208 transmits (via the transmission module 1210) a plurality of subframes. The plurality of subframes may include the plurality of UE-RSs and the specific subframe. The specific subframe may include a reduced number of UE-RSs. Moreover, the specific subframe may include a primary synchronization signal (PSS) and/or a secondary synchronization signal (SSS).

In an aspect, the subset of the plurality of UE-RSs includes UE-RSs transmitted on tones in the specific subframe. In another aspect, the subset of the plurality of UE-RSs includes UE-RSs transmitted on tones in a subframe different from the specific subframe. The UE-RSs transmitted on the tones in the subframe different from the specific subframe may have precoding associated with UE-RSs transmitted on tones in the specific subframe. The tones may be located within six central resource blocks of a predetermined bandwidth.

The apparatus may include additional modules that perform each of the steps of the algorithm in the aforementioned flow chart of FIG. 7. As such, each step in the aforementioned flow chart of FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
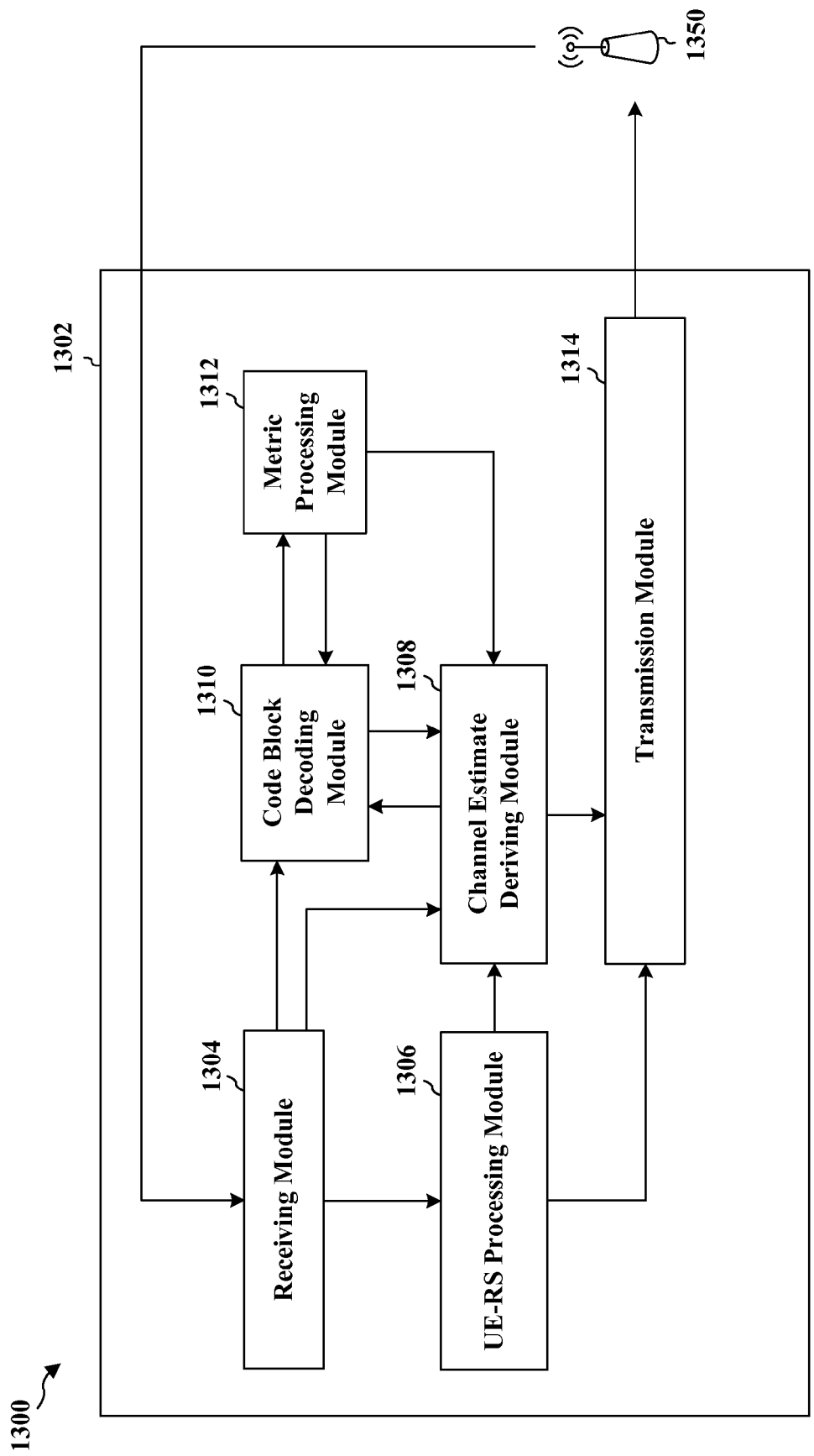
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a UE. The apparatus includes a receiving module 1304, a UE-RS processing module 1306, a channel estimate deriving module 1308, a code block decoding module 1310, a metric processing module 1312, and a transmission module 1314.

The apparatus 1302 may send signals to the eNB 1350 via the transmission module 1314. The UE-RS processing module 1306 receives (via the receiving module 1304) an indication from a base station (e.g., eNB 1350) to utilize a subset of a plurality of UE-specific reference signals (UE-RSs) in order for the channel estimate deriving module 1308 to derive a channel estimate for demodulating data. The plurality of UE-RSs may be transmitted in a plurality of subframes. The indication may be received via Layer 1-based signaling and/or radio resource control (RRC)-based signaling.

The channel estimate deriving module 1308 derives a channel estimate for demodulating data transmitted in a specific subframe using the indicated subset of UE-RSs. The specific subframe may be included in the plurality of subframes.

In an aspect, the subset of the plurality of UE-RSs includes UE-RSs transmitted on tones in the specific subframe, wherein the specific subframe includes a primary synchronization signal (PSS) and/or a secondary synchronization signal (SSS). In another aspect, the subset of the plurality of UE-RSs comprises UE-RSs transmitted on tones in a subframe different from the specific subframe, wherein the specific subframe includes a primary synchronization signal (PSS) and/or a secondary synchronization signal (SSS). The UE-RSs transmitted on the tones in the subframe different from the specific subframe may have a precoding associated with UE-RSs transmitted on tones in the specific subframe. The tones may be located within six central resource blocks of a predetermined bandwidth.

The code block decoding module 1310 receives (via the receiving module 1304) a transport block comprising a plurality of code blocks. The code block decoding module 1310 attempts to decode the plurality of code blocks using a first channel estimate. The first channel estimate may be derived by the channel estimate deriving module 1308 using an initial reference signal.

The code block decoding module 1310 determines whether at least one code block passes a cyclic redundancy check (CRC). If a code block passes the CRC, the code block decoding module 1310 and/or the channel estimate deriving module 1308 stores a data tone of the code block that passed the CRC. The stored data tone may later be used by the channel estimate deriving module 1308 as a reference signal for deriving an improved channel estimate.

If a code block fails the CRC, the channel estimate deriving module 1308 derives an improved channel estimate using a data tone of a code block that passed the CRC as a reference signal in addition to an existing reference signal. Thereafter, the code block decoding module 1310 decodes the at least one code block that failed the CRC using the improved channel estimate.

In an aspect, the operation may repeat to attempt to decode code blocks that still cannot be decoded with the improved channel estimate. For example, the code block decoding module 1310 may determine the existence of at least one other code block that cannot be decoded with the improved channel estimate (e.g., code block still fails CRC). If the at least one other code block exists that cannot be decoded with the improved channel estimate, the channel estimate deriving module 1308 derives a further improved channel estimate using at least one other data tone from a code block that passed the CRC based on the improved channel estimate and/or the existing reference signal. Thereafter, the code block decoding module 1310 decodes the at least one other code block using the further improved channel estimate.

The metric processing module 1312 obtains a metric for each code block of the plurality of code blocks and determines whether a metric for at least one code block meets a predefined criteria. The metric may include an indication of whether a code block passes or fails the CRC, an energy metric reflecting a decoding quality, and/or a signal-to-noise ratio.

If a code block has a metric that meets the predefined criteria, the metric processing module 1312 and/or the channel estimate deriving module 1308 stores a data tone of the code block having the metric that meets the predefined criteria. The stored data tone may later be used by the channel estimate deriving module 1308 as a reference signal for deriving an improved channel estimate.

If a code block has a metric that fails to meet the predefined criteria, the channel estimate deriving module 1308 derives an improved channel estimate using a data tone of a code block having the metric that meets the predefined criteria as a reference signal. Thereafter, the code block decoding module 1310 decodes the at least one code block having the metric that failed to meet the predefined criteria using the improved channel estimate.

In an aspect, the operation may repeat to attempt to decode code blocks that have metrics that still do not meet the predefined criteria using the improved channel estimate. For example, the metric processing module 1312 may determine that a metric for at least one code block still fails to meet the predefined criteria. Accordingly, the channel estimate deriving module 1308 derives a further improved channel estimate using at least one other data tone of at least one other code block having a metric that meets the predefined criteria based on the improved channel estimate. Thereafter, the code block decoding module 1310 decodes the at least one code block having the metric that still fails to meet the predefined criteria using the further improved channel estimate.

The code block decoding module 1310 may receive (via the receiving module 1304) a transport block comprising a single code block. The single code block may be divided into N segments over time and/or frequency, wherein N is an integer. Therefore, the single code block may include a plurality of segments.

The code block decoding module 1310 attempts to decode the plurality of segments of the single code block using a first channel estimate. The first channel estimate may be derived by the channel estimate deriving module 1308 using an initial reference signal.

The metric processing module 1312 may obtain a metric for each segment of the plurality of segments. The metric may include an energy metric reflecting a decoding quality and/or a signal-to-noise ratio.

The channel estimate deriving module 1308 chooses a segment based on the obtained metric and derives an improved channel estimate using a data tone of the chosen segment as a reference signal. Thereafter, the code block decoding module 1310 decodes other segments of the single code block using the improved channel estimate.

The apparatus may include additional modules that perform each of the steps of the algorithm in the aforementioned flow charts of FIGS. 8-11. As such, each step in the aforementioned flow charts of FIGS. 8-11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
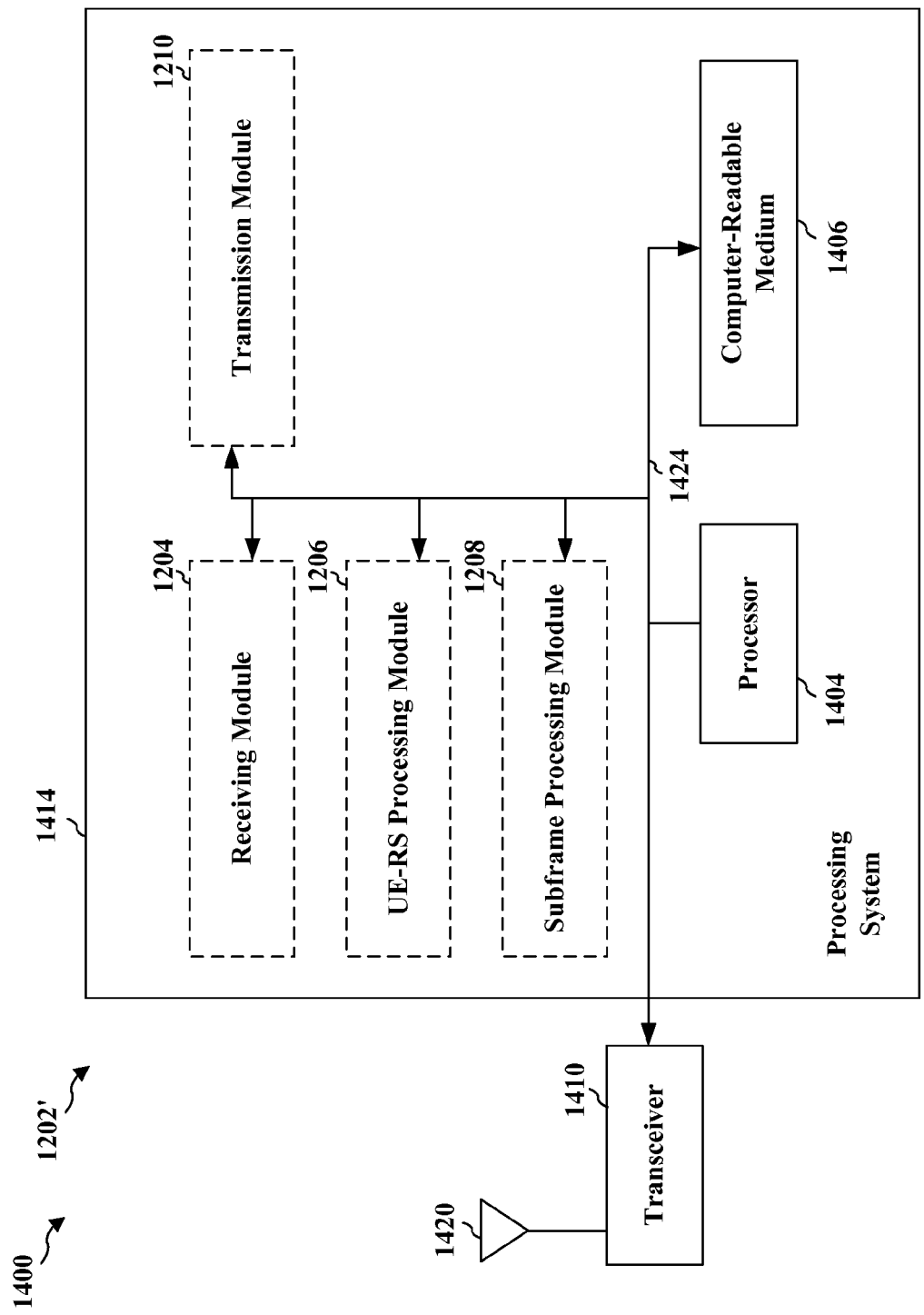
FIG. 14 is a diagram illustrating an example of a hardware implementation for an apparatus employing a processing system.

FIG. 14 is a diagram 1400 illustrating an example of a hardware implementation for an apparatus 1202' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1204, 1206, 1208, 1210, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the receiving module 1204. In addition, the transceiver 1410 receives information from the processing system 1414, specifically the transmission module 1210, and based on the received information, generates a signal to be applied to the one or more antennas 1420. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1204, 1206, 1208 and 1210. The modules may be software modules running in the processor 1404, resident/stored in the computer readable medium 1406, one or more hardware modules coupled to the processor 1404, or some combination thereof. The processing system 1414 may be a component of the eNB 610 and may include the memory 676 and/or at least one of the TX processor 616, the RX processor 670, and the controller/processor 675.

In one configuration, the apparatus 1202/1202' for wireless communication includes means for indicating to a user equipment (UE) to utilize a subset of a plurality of UE-specific reference signals (UE-RSs) to derive a channel estimate for demodulating data in a specific subframe, and means for transmitting a plurality of subframes, the plurality of subframes including the plurality of UE-RSs and the specific subframe, and the specific subframe including a primary synchronization signal (PSS), a secondary synchronization signal (SSS), or both.

The aforementioned means may be one or more of the aforementioned modules of the apparatus 1202 and/or the processing system 1414 of the apparatus 1202' configured to perform the functions recited by the aforementioned means. As described supra, the processing system 1414 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 15:
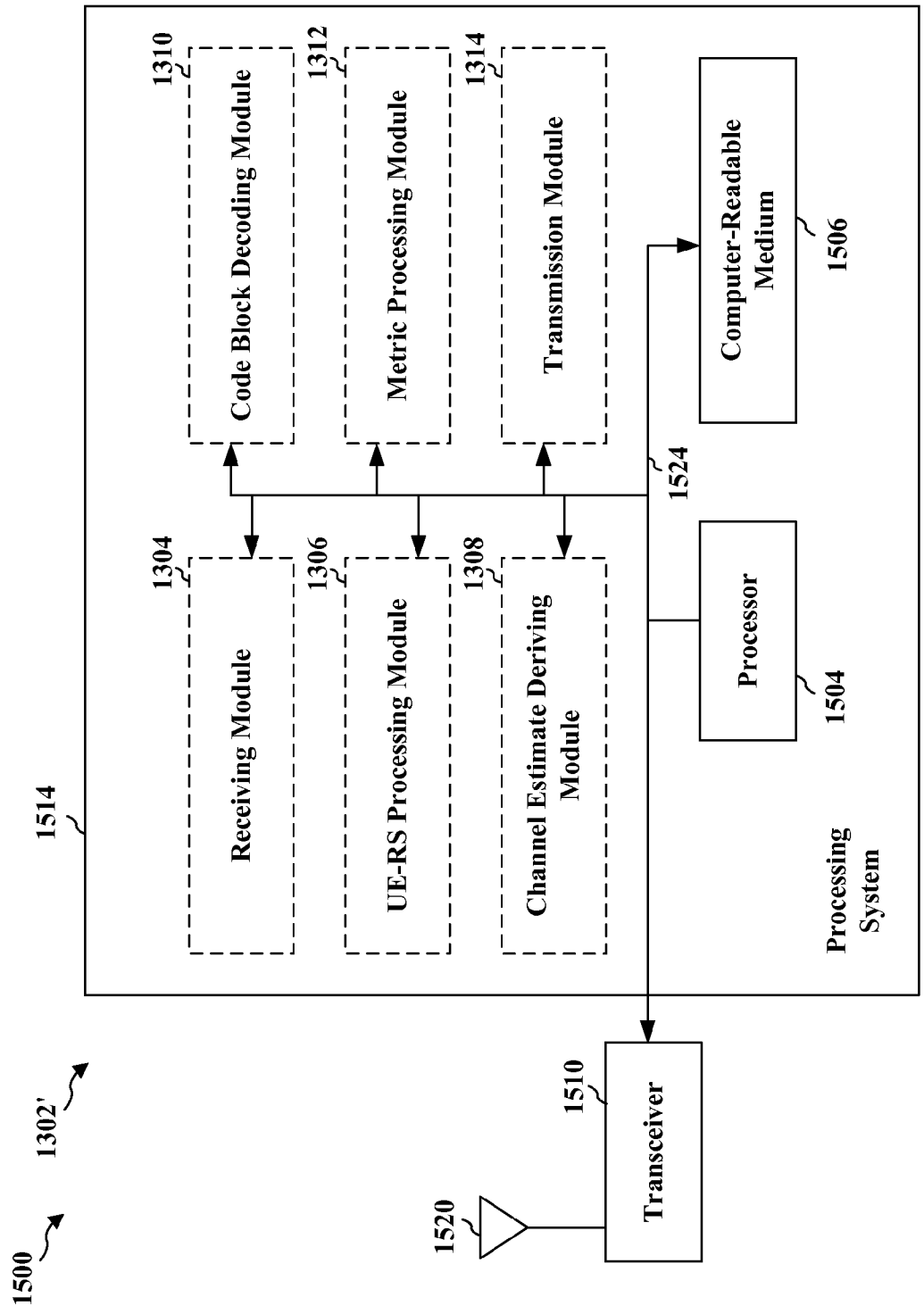
FIG. 15 is a diagram illustrating an example of a hardware implementation for an apparatus employing a processing system.

FIG. 15 is a diagram 1500 illustrating an example of a hardware implementation for an apparatus 1302' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1304, 1306, 1308, 1310, 1312, 1314 and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the receiving module 1304. In addition, the transceiver 1510 receives information from the processing system 1514, specifically the transmission module 1314, and based on the received information, generates a signal to be applied to the one or more antennas 1520. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1304, 1306, 1308, 1310, 1312, and 1314. The modules may be software modules running in the processor 1504, resident/stored in the computer readable medium 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1302/1302' for wireless communication includes means for receiving an indication from a base station to utilize a subset of a plurality of UE-specific reference signals (UE-RSs) for deriving a channel estimate for demodulating data, the plurality of UE-RSs transmitted in a plurality of subframes, means for deriving a channel estimate for demodulating data transmitted in a specific subframe using the indicated subset of UE-RSs, the specific subframe included in the plurality of subframes, means for receiving a transport block comprising a plurality of code blocks, means for attempting to decode the plurality of code blocks using a first channel estimate, means for determining that at least one code block failed a cyclic redundancy check (CRC), means for determining a first code block that passed the CRC, means for deriving an improved channel estimate using a data tone of the first code block that passed the CRC as a reference signal, means for decoding the at least one code block that failed the CRC using the improved channel estimate, means for determining that at least one other code block cannot be decoded with the improved channel estimate, means for deriving a further improved channel estimate using at least one other data tone from a code block that passed the CRC based on the improved channel estimate, means for decoding the at least one other code block using the further improved channel estimate, means for receiving a transport block comprising a plurality of code blocks, means for attempting to decode the plurality of code blocks using a first channel estimate, means for obtaining a metric for each code block of the plurality of code blocks, means for determining that a metric for at least one code block failed to meet a predefined criteria, means for determining that a metric for a first code block meets the predefined criteria, means for deriving an improved channel estimate using a data tone of the first code block having the metric that meets the predefined criteria as a reference signal, means for decoding the at least one code block having the metric that failed to meet the predefined criteria using the improved channel estimate, means for determining that a metric for at least one code block still fails to meet the predefined criteria, means for deriving a further improved channel estimate using at least one other data tone of at least one other code block having a metric that meets the predefined criteria based on the improved channel estimate. means for decoding the at least one code block having the metric that still fails to meet the predefined criteria using the further improved channel estimate, means for receiving a transport block comprising a single code block, the single code block comprising a plurality of segments, means for attempting to decode the plurality of segments of the single code block using a first channel estimate, means for obtaining a metric for each segment of the plurality of segments, means for choosing a segment based on the obtained metric, means for deriving an improved channel estimate using a data tone of the chosen segment as a reference signal, and means for decoding other segments of the single code block using the improved channel estimate.

The aforementioned means may be one or more of the aforementioned modules of the apparatus 1302 and/or the processing system 1514 of the apparatus 1302' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    transmitting a signal to a user equipment (UE) comprising an indication for the UE to utilize a subset of a plurality of received UE-specific reference signals (UE-RSs) to derive a channel estimate for demodulating data in a specific subframe, the subset being less than all of the plurality of received UE-RSs; and
    transmitting a plurality of subframes, the plurality of subframes including the plurality of UE-RSs and the specific subframe, and the specific subframe including a reduced number of UE-RSs.

2. The method of claim 1, wherein the specific subframe includes a primary synchronization signal (PSS), a secondary synchronization signal (SSS), or both.

3. The method of claim 1, wherein the UE is configured via Layer 1-based signaling, radio resource control (RRC)-based signaling, or both.

4. The method of claim 1, wherein the subset of the plurality of UE-RSs comprises a subset of the received UE-RSs transmitted on tones in the specific subframe, the subset being less than all of the received UE-RSs transmitted on tones in the specific subframe.

5. The method of claim 1, wherein the subset of the plurality of UE-RSs comprises UE-RSs transmitted on tones in a second subframe different from the specific subframe, and wherein the indication indicates for the UE to utilize the subset of the plurality of received UE-RSs in the second subframe to derive the channel estimation for the specific subframe.

6. The method of claim 5, wherein the UE-RSs transmitted on the tones in the subframe different from the specific subframe has precoding associated with UE-RSs transmitted on tones in the specific subframe.

7. The method of claim 5, wherein the tones are located within six central resource blocks of a predetermined bandwidth.

8. A method of wireless communication, comprising:
    receiving a signal from a base station comprising an indication to utilize a subset of a plurality of received UE-specific reference signals (UE-RSs) for deriving a channel estimate for demodulating data, the subset being less than all of the plurality of received UE-RSs, and wherein the plurality of UE-RSs are transmitted in a plurality of subframes; and
    deriving a channel estimate for demodulating data transmitted in a specific subframe using the indicated subset of UE-RSs, the specific subframe included in the plurality of subframes.

9. The method of claim 8, wherein the indication is received via Layer 1-based signaling, radio resource control (RRC)-based signaling, or both.

10. The method of claim 8, wherein the subset of the plurality of UE-RSs comprises a subset of the UE-RSs received on tones in the specific subframe, the specific subframe including a primary synchronization signal (PSS), a secondary synchronization signal (SSS), or both, the subset being less than all of the UE-RSs received on tones in the specific subframe.

11. The method of claim 8, wherein the subset of the plurality of UE-RSs comprises UE-RSs received on tones in a second subframe different from the specific subframe, the specific subframe including a primary synchronization signal (PSS), a secondary synchronization signal (SSS), or both, and
    wherein the indication indicates for the UE to utilize the subset of the plurality of received UE-RSs in the second subframe to derive the channel estimation for the specific subframe.

12. The method of claim 11, wherein the UE-RSs transmitted on the tones in the subframe different from the specific subframe has a precoding associated with UE-RSs transmitted on tones in the specific subframe.

13. The method of claim 11, wherein the tones are located within six central resource blocks of a predetermined bandwidth.

14. An apparatus for wireless communication, comprising:
    means for receiving a signal from a base station comprising an indication to utilize a subset of a plurality of received UE-specific reference signals (UE-RSs) for deriving a channel estimate for demodulating data, the subset being less than all of the plurality of received UE-RSs, and wherein the plurality of UE-RSs transmitted in a plurality of subframes; and
    means for deriving a channel estimate for demodulating data transmitted in a specific subframe using the indicated subset of UE-RSs, the specific subframe included in the plurality of subframes.

15. The apparatus of claim 14, wherein the indication is received via Layer 1-based signaling, radio resource control (RRC)-based signaling, or both.

16. The apparatus of claim 14, wherein the subset of the plurality of UE-RSs comprises a subset of the received UE-RSs transmitted on tones in the specific subframe, the specific subframe including a primary synchronization signal (PSS), a secondary synchronization signal (SSS), or both.

17. The apparatus of claim 14, wherein the subset of the plurality of UE-RSs comprises UE-RSs transmitted on tones in a second subframe different from the specific subframe, the specific subframe including a primary synchronization signal (PSS), a secondary synchronization signal (SSS), or both, and
    wherein the indication indicates for the apparatus to utilize the subset of the plurality of received UE-RSs in the second subframe to derive the channel estimation for the specific subframe.

18. The apparatus of claim 17, wherein the UE-RSs transmitted on the tones in the subframe different from the specific subframe has a precoding associated with UE-RSs transmitted on tones in the specific subframe.

19. The method of claim 1, wherein the indication indicates to the UE to refrain from using at least one of the plurality of received UE-RSs to derive the channel estimate for demodulating data in the specific subframe.

20. The method of claim 1, wherein the subset of the plurality of received UE-RSs comprise UE-RSs that pass a cyclic redundancy check.

21. The apparatus of claim 14, wherein the indication indicates to the UE to refrain from using at least one of the plurality of received UE-RSs to derive the channel estimate for demodulating data in the specific subframe.

22. The apparatus of claim 14, wherein the subset of the plurality of received UE-RSs comprise UE-RSs that pass a cyclic redundancy check.

23. An apparatus for wireless communication, comprising:
   a memory; and
   at least one processor coupled to the memory and configured to:
      transmit a signal to a user equipment (UE) comprising an indication for the UE to utilize a subset of a plurality of received UE-specific reference signals (UE-RSs) to derive a channel estimate for demodulating data in a specific subframe, the subset being less than all of the plurality of received UE-RSs; and
      transmit a plurality of subframes, the plurality of subframes including the plurality of UE-RSs and the specific subframe, and the specific subframe including a reduced number of UE-RSs.

24. The apparatus of claim 23, wherein the UE is configured via Layer 1-based signaling, radio resource control (RRC)-based signaling, or both.

25. The apparatus of claim 23, wherein the subset of the plurality of UE-RSs comprises a subset of the received UE-RSs transmitted on tones in the specific subframe, the specific subframe including a primary synchronization signal (PSS), a secondary synchronization signal (SSS), or both.

26. The apparatus of claim 23, wherein the subset of the plurality of UE-RSs comprises UE-RSs transmitted on tones in a second subframe different from the specific subframe, the specific subframe including a primary synchronization signal (PSS), a secondary synchronization signal (SSS), or both, and
   wherein the indication indicates for the UE to utilize the subset of the plurality of received UE-RSs in the second subframe to derive the channel estimation for the specific subframe.

27. The apparatus of claim 26, wherein the UE-RSs transmitted on the tones in the second subframe different from the specific subframe has a precoding associated with UE-RSs transmitted on tones in the specific subframe.

28. The apparatus of claim 26, wherein the tones are located within six central resource blocks of a predetermined bandwidth.

29. The apparatus of claim 23, wherein the indication indicates to the UE to refrain from using at least one of the plurality of received UE-RSs to derive the channel estimate for demodulating data in the specific subframe.

30. The apparatus of claim 23, wherein the subset of the plurality of received UE-RSs comprise UE-RSs that pass a cyclic redundancy check.

* * * * *